United States Patent [19]

D'Errico

[11] Patent Number: 5,529,849
[45] Date of Patent: Jun. 25, 1996

[54] PLASTICIZED POLYVINYL BUTYRAL SHEET CONTAINING EPOXY RESIN

[75] Inventor: John J. D'Errico, Glastonbury, Conn.

[73] Assignee: Monsanto Company, St. Louis, Mo.

[21] Appl. No.: 415,806

[22] Filed: Apr. 3, 1995

Related U.S. Application Data

[62] Division of Ser. No. 88,147, Jul. 1, 1993.

[51] Int. Cl.$^6$ .............................. B32B 27/38; G02B 5/28
[52] U.S. Cl. ................ 428/415; 428/426; 428/432; 428/433; 428/436; 428/437; 428/469; 428/699; 428/701; 428/702; 428/913; 359/359; 359/360; 359/580
[58] Field of Search ..................... 428/415, 436, 428/437, 426, 432, 433, 469, 699, 701, 702, 913; 350/1.6, 1.7, 164

[56] References Cited

U.S. PATENT DOCUMENTS

| | | | |
|---|---|---|---|
| 4,782,216 | 11/1988 | Woodard | 219/547 |
| 4,799,745 | 1/1989 | Meyer et al. | 350/1.7 |
| 5,061,568 | 10/1991 | Kessel et al. | 428/437 |

FOREIGN PATENT DOCUMENTS

| | | |
|---|---|---|
| 63-306551 | 12/1988 | Japan . |
| 2102281 | 4/1990 | Japan . |
| 2074089 | 10/1981 | United Kingdom . |

*Primary Examiner*—P. C. Sluby
*Attorney, Agent, or Firm*—Michael J. Murphy

[57] ABSTRACT

Plasticized polyvinyl butyral sheet containing epoxy resin in amount effective, after prolonged exposure to light, to counteract reduction of adhesion between the sheet and a photoreactive component with which it will be in potential contact. The photoreactive component is typically a dielectric such as a metal oxide layer of a heat-wave-reflective or electrically conductive multi-layer coating, which coating can optionally be supported on (a) a thermoplastic substrate sandwiched between two of such polyvinyl butyral sheets forming a prelaminate for use as a constituent of a laminated glazing panel or (b) a glass sheet component of such glazing panel.

12 Claims, No Drawings

PLASTICIZED POLYVINYL BUTYRAL SHEET CONTAINING EPOXY RESIN

This is a DIVISION of copending application Ser. No. 08/088,147, filed Jul. 1, 1993, pending.

BACKGROUND OF THE INVENTION

This invention relates to polyvinyl butyral sheet for light-transmitting, layered safety glazing panels and more particularly to such sheet formulated to improve performance when a heat-wave-reflective or electrically conductive coating is included in such panels.

Light transmitting safety glazings for window, windshield, sunroof, skylight, intrusion security, showcase, picture frame and like applications are well-known. They include one or more rigid transparent panels such as glass combined in a laminate with an impact-dissipating plastic sheet such as plasticized polyvinyl butyral (PVB). It is likewise known to control the strength of the bond between the plastic sheet and rigid panel at a desired level since if too high the plastic sheet undesirably ruptures on impact and if too low, splinters of the rigid panel can separate from the glazing, and if glass, can injure a person in the surrounding area.

It is further known to incorporate heat-wave-reflective multi-layer coatings (sometimes called "stacks") into such safety glazings to reflect infra-red radiation while transmitting significant visible light. The effect is to reduce temperature increase from solar radiation within an area delimited by one or more of such safety glazing panels. Heating a metal layer of such multi-layer coatings by electrical conductance reduces the time required for defrosting or defogging. Representative structures for vehicle windshields are disclosed in U.S. Pat. Nos. 4,799,745 and 4,782,216. In such safety glazings, the initially exposed, uncovered top layer of the multi-layer coating often contacts the plasticized PVB sheet. Such top coating layer is often photosensitive in that after extended exposure to light, the initially strong bond between the sheet and top coating layer deteriorates.

As disclosed in U.S. Pat. No. 5,061,568 and European Patent Application 263623 published Apr. 13, 1988, this adhesion durability problem has been addressed by proposing a special cap layer on the heat-wave-reflective coating to contact the plasticized PVB, which cap layer is chosen for its capability to preserve the bond under the influence of light. Though overcoming the adhesion problem, such cap layers are usually deposited by an additional process sputtering step which can be slow and therefore costly to the total value of the safety glazing panel.

SUMMARY OF THE INVENTION

Now improvements have been made in light-resistant adhesion of plasticized PVB sheet to photoreactive components of laminated glazing panels which reduce shortcomings of the prior art by avoiding reliance on sputtered cap layers.

Accordingly, a principal object of this invention is to stabilize the adhesion between plasticized PVB sheet and a photoreactive component(s) of a laminated glazing panel.

Another object is to provide light-resistant adhesion between plasticized PVB sheet and a dielectric layer of a heat-wave-reflective or electrically conductive coating of a laminated glazing panel.

A specific object is to improve the adhesion stability of the bond between plasticized PVB sheet and a heat-wave reflective or electrically conductive coating on glass.

A further object is to enhance such long-term adhesion by modifying the formulation of the plasticized PVB sheet.

Other objects will in part be obvious and will in part appear from the following description and claims.

These and other objects are accomplished by providing plasticized polyvinyl butyral sheet containing epoxy resin in amount effective, after prolonged exposure to light, to counteract reduction of adhesion between the sheet and a photoreactive component with which it will be in potential contact.

Also provided is plasticized polyvinyl butyral sheet containing epoxy resin bonded to a photoreactive layer of a heat-wave-reflective or electrically conductive coating, the epoxy resin present in amount effective, after prolonged exposure to light, to counteract reduction of adhesion at the bond interface.

Further provided is a prelaminate for a glazing panel having improved resistance to light exposure comprising two plasticized polyvinyl butyral sheets and an interposed intermediate layer supported on a thermoplastic substrate, the intermediate layer containing a photoreactive layer bonded to one of the plasticized polyvinyl butyral sheets, the plasticized polyvinyl butyral sheet bonded to the photoreactive layer comprising one or more epoxy resins in amount effective to counteract reduction of adhesion to the photoreactive layer after prolonged exposure to light.

Also provided is a laminated glazing panel sequentially comprising: (A) a glass sheet; (B) a heat-wave-reflective or electrically conductive multi-layer coating which includes a photoreactive layer; and (C) a sheet of plasticized polyvinyl butyral in interfacial contact with the photoreactive layer containing epoxy resin in amount effective to counteract reduction of adhesion between the sheet and the photoreactive layer after prolonged exposure of the glazing panel to light.

DETAILED DESCRIPTION OF THE INVENTION

In addition to stabilizing adhesion to photoreactive component(s) of a heat-wave-reflective or electrically conductive coating after prolonged exposure to light, epoxy resin usable in the invention, at concentrations described below, should have no significant adverse effect on processing plasticized PVB resin or on performance properties of the sheet of which it is a component. In this latter respect, usable epoxy resins: a) should readily mix with components of formulations of conventional plasticized PVB sheet for laminated safety glass, i.e. PVB resin, PVB plasticizer, glass adhesion control and related property-enhancing additives; b) should be melt processable in such formulations in conventional equipment such as extruders, sheeting dies, mill rolls and the like; and c) as a component of sheet which on one side will always contact a glass pane of a laminated safety glazing, have little or no affect on adhesion to glass (as opposed to the photoreactive component), such glass adhesion being regulated by glass adhesion-reducing agent in the sheet formulation. To determine whether an epoxy is functional as an adhesion-stabilizer in the context first mentioned above, the pane of glass of a glass laminate which is nearest the bond between the photoreactive component and the plasticized PVB sheet containing the epoxy resin must display a pummel adhesion (described further below)

of at least 3.0 after at least 1000 hours exposure in a Weatherometer, Fadeometer or equivalent accelerated aging exposure system. By sufficient preliminary tests, one skilled in the art can readily determine particular usable epoxy resins. With the foregoing criteria in mind, usable epoxy resins may vary in chemical identity. Preferred epoxy compositions found usable as hereinafter described are selected from (a) epoxy resins comprised mainly of the monomeric diglycidyl ether of bisphenol-A; (b) epoxy resins comprised mainly of the monomeric diglycidyl ether of bisphenol-F; (c) epoxy resins comprised mainly of the hydrogenated diglycidyl ether of bisphenol-A; (d) polyepoxidized phenol novolacs; (e) diepoxides of polyglycols, alternatively known as an epoxy terminated polyether; and (f) a mixture of any of the foregoing epoxy resins of (a) through (e). To save unnecessarily detailed description, further information on these classes is in the Encyclopedia of Polymer Science and Technology, Volume 6, 1967, Interscience Publishers, N.Y., pages 209–271, which is incorporated herein by reference.

A suitable commercially available diglycidyl ether of bisphenol-A of class (a) is DER 331 from Dow Chemical Company. A diglycidyl ether of bisphenol-F epoxy of class (b) is EPON Resin DPL-862 and a hydrogenated diglycidyl ether of bisphenol-A epoxy of class (c) is EPONEX Resin 1510, both of the latter available from Shell Chemical Company. A polyepoxidized phenol formaldehyde novolac of class (d) is available from Dow Chemical as DEN 431. A diepoxide of poly(oxypropylene) glycol of class (e) is available from Dow Chemical as DER 732.

Epoxy resins found unsuitable as adhesion promoters for this application are epoxidized soybean oil and octyl epoxy tallate. Though presently lacking experimental evidence, it is postulated that the functional epoxy groups in these latter resins are situated between hydrocarbon groups of varying lengths, thereby hindering access of the epoxy groups to the photoreactive layer of the heat-wave reflective coatings. This is contrasted with the successful epoxies noted above where epoxy groups are at the ends of the molecules and therefore thought to be readily accessible for association with the photoreactive layer of the heat-wave reflective coating.

PVB resin in sheet of the invention has a weight average molecular weight greater than 100,000, preferably from about 200,000 to 300,000, as measured by size exclusion chromatography using low angle laser light scattering. Such PVB comprises, on a weight basis, 15 to 25% preferably 18 to 22% hydroxyl groups calculated as polyvinyl alcohol (PVOH); 0 to 10%, preferably 0 to 3% residual ester groups, calculated as polyvinyl ester, e.g. acetate, with the balance being butyraldehyde acetal.

PVB resin is produced by known aqueous or solvent acetalization by reacting butyraldehyde with PVOH in the presence of acid catalyst to produce PVB, followed by neutralization of the catalyst, separation, stabilization and drying of the resin. It is available from Monsanto Company as Butvar® resin.

In forming sheet, the PVB resin must be plasticized with about 20 to 80 and more commonly 25 to 45 parts plasticizer per hundred parts of resin. The latter concentration is generally used with PVB containing 18 to 22% vinyl alcohol by weight. Plasticizers commonly employed are esters of a polybasic acid or a polyhydric alcohol. Suitable plasticizers are trimethylene glycol di-( 2-ethylbutyrate), dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Also mixed adipates made from $C_4$ to $C_9$ alkyl alcholos and cyclo $C_4$ to $C_{10}$ alcohols as disclosed in U.S. Pat. No. 5,013,779. $C_6$–$C_8$ adipate esters such as hexyl adipate are preferred plasticizers.

Plasticized PVB sheet about 0.13 to 1.3 mm thick for adequate impact absorption in a laminate is formed by initially mixing the PVB resin, plasticizer, and epoxy resin to form a sheet formulation and then extruding the formulation, usually through a sheeting die, i.e. forcing the molten, plasticized PVB through a horizontally long, vertically narrow die opening substantially conforming in length and width to that of the sheet being formed. Alternatively such sheet may be formed by casting the molten formulation issuing from an extrusion die onto a specially prepared surface of a die roll turning in close proximity to the die exit to impart desired surface characteristics to one side of the molten formulation. When the roll surface has minute peaks and valleys, sheet formed of polymer cast thereon will have a rough surface on the side contacting the roll which generally conforms respectively to such valleys and peaks. A rough surface on the other side can be provided by the design of the die opening through which the extrudate passes. Such a die opening configuration is more particularly shown in FIG. 4 of U.S. Pat. No. 4,281,980. Alternative known techniques of producing a rough surface on one or both sides of an extruding sheet involve the specification and control of one or more of the following: polymer molecular weight distribution, water content and temperature of the melt. Such techniques are disclosed in U.S. Pat. Nos. 2,904,844; 2,909,810; 3,994,654; 4,575,540 and European Patent No. 0185,863. As is known, this rough surface is temporary to particularly facilitate deairing during laminating after which it is melted smooth from the elevated temperature and pressure associated with autoclaving, in which state it is optically transparent.

Glass adhesion control agents are included in the sheet formulation to reduce the strength of the bond between contacting surfaces of the epoxy resin modified PVB sheet and a glass layer of the final laminated safety glazing. Such glass-contacting PVB sheet surface in the structures to be presently described is the PVB sheet side opposite the sheet side contacting the photoreactive component. Glass adhesion control (i.e. reducing) agents are known and typically disclosed in U.S. Pat. Nos. 3,249,487; 3,855,055; 3,249,488; 4,292,372; 4,379,116; 3,402,099; 3,371,235 and 4,180,620, the PVB additive disclosure of each of which is incorporated herein by reference. Preferred glass adhesion control agents include monovalent and multivalent, for example divalent, metal salts of $C_1$ to $C_8$ organic, preferably aliphatic, monocarboxylic acids where, for example, the metal cation is potassium, magnesium, calcium, sodium or zinc. Representative anions are acetate, butyrate, substituted butyrates such as 2-ethyl butyrate, octanoate etc. Magnesium 2-ethyl butyrate is a preferred glass adhesion control agent. The concentration of glass adhesion control agent in the sheet for the desired level of glass adhesion will generally be about 0.01 to 0.1 (preferably 0.01 to 0.05) weight percent based on PVB resin or 100 to 500 parts, preferably 200 to 400 parts by weight per million parts of combined plasticizer, PVB resin, epoxy resin and other additive(s) (if any).

The concentration of epoxy resin in the sheet should be adequate after prolonged exposure of the sheet to light (further described hereafter) to preserve the bond between the sheet and photoreactive component(s) at a bond strength which provides the desired impact performance in the final laminated glazing panel while, as noted above, not adversely affecting the desired bond of the sheet with glass. In this regard, just as an artisan is concerned with glass adhesion not being too high or low, so also in this invention the bond with the photosensitive component(s) after prolonged exposure to light cannot be too high or low to avoid such bond controlling the overall impact performance of the glazing. For example, concentrations on the order of 20 weight percent epoxy (based on PVB resin) in the sheet provide far too high adhesion to glass whereas 1 phr of epoxy is inadequate to provide any noticeable effect on adhesion to photoreactive dielectric layers after long term light exposure. Concentrations of about 3 to about 10, preferably about 4 to 7 parts epoxy resin per 100 parts PVB resin in the sheet have generally been found to provide the desired balance of properties.

In addition to plasticizer, epoxy resin and glass adhesion-reducing agent(s) the PVB sheet of the invention may contain other performance-enhancing additives such as pigments or dyes, light stabilizers, anti-oxidants and the like.

The epoxy resin modified plasticized PVB sheet of the invention is designed for laminating contact with a component sufficiently photoreactive after prolonged exposure to light, e.g. UV radiation from the solar spectrum, as to unacceptably deteriorate the strength of the interfacial bond between the photoreactive component and conventional unmodified plasticized PVB sheet. Such photoreactive component can vary in identity and can typically be any functional member or layer or coating included in a safety glazing to improve its performance. It is usually the uppermost exposed layer of a multi-layer, heat-wave reflective or electrically conductive coating comprising a stack of successively deposited layers of metals, metal (usually dielectric) compounds and the like on a substrate. Such metal/dielectric stacks are called optical interference filters of the Fabry-Perot type designed, principally through the appropriate selection of materials and their thicknesses to maximize (i) transmission of visible or luminous and (ii) reflection of heat-generating infra-red (IR) portions (700–2125 nm) of the solar spectrum. The multiple, sequentially deposited planar layers of angstroms-thick metal and dielectric layers are arranged in a predetermined sequence in face-adhering, contiguous contact with each other, as generally disclosed in U.S. Pat. Nos. 3,682,528 and 4,179,181 which are incorporated herein by reference.

Heat-wave reflective coatings are usable in any optically transparent window application. Typical applications include aircraft, locomotive and automotive windshields and architectural applications such as commercial and residential buildings. By conductively associating the metal layer(s) with a source of electrical power, usually through the use of bus bars, defrosting or defogging or deicing capability is provided in the assembly.

Preferred heat-wave reflective coatings contain at least two near IR reflecting metal underlayers which transmit at least 70% visible light of normal incidence measured as specified in ANSI Z26.1, this being the minimum required in the U.S. automotive industry. Somewhat less is acceptable in less demanding architectural applications where a single metal layer or other more light absorbing metal/dielectric stacks may be used. The metal layer(s) are separated vertically in the thickness direction from each other by one or more dielectric layers so reflection of visible light from the metal layer(s) interferes destructively thereby enhancing visible transmission. Usable metals comprise silver, aluminum, chromium, zinc, tin, nickel, brass, gold, stainless steel, copper, and alloys or claddings of any of the foregoing. Silver at a thickness of between 60 to 200, preferably 80 to 140 Angstroms, is preferred.

The dielectric layer must be essentially transparent over the visible range and at least one must exist between a pair of metal layers (called a "spacer dielectric layer") and preferably a dielectric layer is on each side of a metal layer. Usable dielectric materials include $WO_3$, $In_2O_3$, $SnO_2$, ITO, $Al_2O_3$, $MgF_2$, ZnS, $TiO_2$, ZnO and the like.

Varying the thickness and composition of a spacer dielectric layer varies the optical transmittance/reflection properties considerably. More specifically, varying the thickness of a spacer dielectric layer varies the wave length associated with the reflection suppression (or transmission enhancement) band. In addition to choice of metal, thickness also determines its reflectivity, the thinner the layer, the less its reflectivity. Generally, the thickness of spacer dielectric layer(s) should be about 200 to 1200, preferably 450 to 1000 A, to obtain the desired optical properties in a commercially acceptable product.

Exterior dielectric layers contacting metal layer surfaces opposite to metal surfaces contacting spacer dielectric layer(s) enhance anti-reflection performance. Exterior dielectric layers generally should have a higher refractive index than glass or polyvinyl butyral, i.e. greater than 1.5 and preferably greater than 1.8. The thickness of such exterior or outside dielectric layer(s) is generally less than spacer dielectric layer(s) and should be about 20 to 600, preferably 50 to 500 A. Such exterior dielectric layers typically form the initially uncovered exposed surface of the multi-layer coating which contacts the plasticized PVB sheet. These dielectrics are representative of photoreactive components with which the epoxy-modified sheet of the invention is particularly usable. Exterior dielectric layers in composition include those listed as spacer layers above. Preferred dielectric (photoreactive) layers as most frequently encountered in commercial structures are ZnO, chromium oxide (composed of CrO, $CrO_2$, $CrO_3$ and $Cr_2O_3$), $In_2O_3$, SnO and ITO.

The substrate for a heat-wave reflective and/or electrically conductive coating comprises one or plural layers, one of which supports the multi-layer metal/dielectric coating in that a layer of the latter is in face-to-face contact with the substrate. The substrate can be any of a variety of materials. Usable substrates should not be prone to stretch to avoid cracking the metal/dielectric layers and should be free of excess volatiles such as plasticizers, water vapor or absorbed gases. A dielectric layer contacting the substrate should adhere well to the substrate. Dielectrics generally adhere well to glass, ceramics and certain flexible plastics such as polyesters, cast acrylics, polycarbonates, chlorinated plastics and epoxies. Uncrosslinked polyurethanes and plasticized polyvinyl butyral substrates in direct supportive contact with the metal/dielectric stack are too soft and extensible. Preferred substrates are sheet(s) of transparent materials such as glass or non-extensible flexible thermoplastic materials such as linear polyesters, e.g. polyethylene terephthalate (PET) (or equivalent material having the characteristics of PET) which is commercially available as Mylar® or Hostaphan from Hoechst Celanese Corp. In two preferred structures the layers of the metal/dielectric stack are sequentially magnetron-sputtered in one case on glass and another on a flexible substrate film of PET. In one preferred form, the glass substrate carrying the metal/dielectric stack is laminated to the epoxy-resin modified sheet of the invention (dielectric layer in contact with one side of the sheet) to which a second glass layer is then laminated to the exposed side of the modified PVB sheet. In the other preferred structure, the PET film carrying the metal/dielectric stack is encapsulated within two layers of plasticized polyvinyl butyral, one layer of which abuts the PET substrate and the other of which abuts the top layer of the stack and is the epoxy-resin modified sheet of the invention. The multilayered sandwich containing plasticized PVB as the outer layers in the second preferred structure is then conventionally laminated between two rigid members such as glass panes, or alternatively may be used as a bilayer structure by laminating it to one such rigid member intended to be the exterior side of a window.

Stability of the bond at the interface between the epoxy-resin-containing plasticized PVB sheet and the photoreactive, preferably anti-reflective, layer of a multi-layer metal/ dielectric stack is measured by accelerated aging of the assembly by exposure to a source of intense radiation in the form of a Fadeometer (carbon arc source), Weatherometer (xenon arc source) or equivalent system in which a large percentage of emitted light is composed of UV radiation. Stability of the bond to light-induced, and more particularly ultraviolet light-induced, degradation as determined by the Pummel Adhesion Test further described hereafter, is considered adequate if an assembly survives at least 1000 hours in such an accelerated aging system. This is about equal to one year of intense sunlight exposure as might be encountered in Arizona, which in turn is representative of a longer period of exposure to less severe conditions.

The Pummel Adhesion Test was used to measure the impact-absorbing level of interfacial adhesion of the PVB layer to a dielectric layer, usually of a multi-layered metal/ dielectric stack with which it is in contact. Glass laminates containing the metal/dielectric stack (or in certain cases only a dielectric layer) and adhering plasticized PVB layer were conditioned to 0° F. (− 17° C.), pummeled with a 1 pound (454 g) hammer to break the glass and all broken glass unadhered to the PVB layer removed. The amount of glass left adhered to the PVB layer is visually compared to a set of standards of known pummel scale, the higher the number of the standard, the more glass remaining adhered to the interlayer—i.e. at a pummel of zero, no glass at all is left whereas at a pummel of 10, 100% of the interlayer surface is adhered to glass. Good impact dissipation is correlatable with a pummel adhesion value of 3.0 to 7, preferably 4 to 6. At less than 3.0, too much glass is lost on impact whereas at more than 7 adhesion is too high and impact strength is poor.

The invention is further described with reference to the following exemplary Example which is not intended to imply any limitation or restriction on the invention. Unless otherwise indicated, parts and percentages are by weight.

EXAMPLE

A. Photoreactive Layer Adhesion

Samples were prepared of standard float glass (7.6×10× 0.3 cm) sputter coated using a Leybold Heraeus sputter coater in known manner with three successive layers of zinc oxide dielectric and silver metal to provide a heat-wave-reflective multi-layer coating which, if operatively associated in known manner with bus bars in contact with the metal layer (see, for example, U.S. Pat. No. 4,782,216) would be electrically conductive. The resulting structure and layer thicknesses were: glass/ZnO (400 A) (layer-1)/Ag (150A) (layer 2)/ZnO (400A) (layer 3). As reflected by the accelerated aging data for the control samples below, the exposed ZnO dielectric top layer is the photoreactive component in the context of the invention. In another instance a ten layer heat-wave reflective coating on float glass was capped with about 50A of uncovered TiOx where x was believed equal to 2. Further samples were prepared where single dielectric photoreactive layers of indium oxide ($In_2O_3$) of about 100 to 200A thickness were sputter deposited on the float glass to simulate expected performance if such single layer was the top exposed layer of a multi-layer coating.

Epoxy resin (five parts per 100 parts PVB resin=5 phr) was dissolved in dihexyl adipate plasticizer (32 parts plasticizer per 100 parts resin) which was then mixed for 7 min with PVB resin having 20.4% vinyl alcohol groups in a Brabender mixer operating at 190° C. Tinuvin 328 (0.3–0.5 pph on PVB resin) was included as UV stabilizer. 1280 ppm (resin) magnesium di(2-ethylbutyrate) was used for glass adhesion control. After cooling to room temperature, 0.76 mm sheets were compression molded from the mixtures using heated (177° C.) platens at 4000–5000 psi (27,560–34, 450 kPa). The plasticized PVB sheet samples were laminated to the exposed photoreactive dielectric layers described above using standard laminating conditions of about 143° C., 1275 kPa. Then a second layer of float glass was laminated to the exposed surface of the plasticized PVB sheet (with "air" side of glass against the sheet). Epoxy resins used are identified as follows:

| Code | Identification | Source |
|---|---|---|
| E1 | Diglycidyl ether of bisphenol A | Dow Chemical DER 331 |
| E2 | Diglycidyl ether of bisphenol-F | Shell Chemical EPON Resin DPL-862 |
| E3 | Hydrogenated diglycidyl ether of bisphenol A | Shell Chemical EPONEX Resin 1510 |
| E4 | Polyepoxidized phenol formaldehyde novolac | Dow Chemical DEN 431 |
| E5 | Diepoxide of poly(oxypropylene) glycol | Dow Chemical DER 732 |

The laminate samples were placed in a xenon arc Weatherometer with the metal/dielectric stack facing the xenon arc and above the plasticized PVB sheet. Pummel adhesion (PA) was measured with time on the layer of glass on which the metal and/or metal oxide was deposited, with results in Table 1 following. In all cases PA of the controls (no epoxy) on the glass layer just described, measured immediately after forming the laminates (i.e. zero time in the Weatherometer), was acceptable and therefore not included in the Table, which meant the dielectric layer had not yet photoreactively degraded the bond with the PVB sheet. A PA of between 3 and 7 was acceptable and this is presented in the Table by listing (in parenthesis) the number of accelerated exposure hours after which this acceptable PA was measured. A PA less than 3 is unacceptable and such samples are listed as "F" (for "failed") followed by the number of hours during which that sample had been exposed before the unacceptable PA was measured.

TABLE 1

| Identity Epoxy In Sheet | Identity of Photoreactive Layer | | |
|---|---|---|---|
| | ZnO | $In_2O_3$ | $T_iO_2$ |
| None | F(2000) | F(100) | F(500) |
| E1 | 3(2000) | F(1000) | F(2000) |
| E2 | 3(2000) | 4(2000) | F(2000) |
| E3 | F(2000) | F(1000) | 3(1000) |
| E4 | 5(2000) | 4(1000) | F(500) |

TABLE 1-continued

| Identity Epoxy In Sheet | Identity of Photoreactive Layer | | |
|---|---|---|---|
| | ZnO | In$_2$O$_3$ | T$_i$O$_2$ |
| E5 | 4(2000) | 4(2000) | 3(2000) |

The above results show that after at least 1000 hours accelerated exposure in a Weatherometer the presence of 5 phr epoxy resin in PVB sheet improves the adhesion stability of the sheet to a variety of photoreactive metal/dielectric stacks or dielectric coatings, in comparison with such adhesion without the epoxy resin presence. Various epoxy resins can be used depending on the identity of the contacting photoreactive layer. From the above data, E5 (diepoxide of poly(oxypropylene) glycol) is a preferred material.

B. Glass Adhesion

The sheet samples described above were screened for possible interference by the epoxy resin with adhesion to glass, such glass adhesion being regulated by the glass adhesion-reducing agent in the sheet formulation. PA's of the second glass layer of the two glass layer laminates described in Section A above (i.e. the uncoated glass layer in direct contact with the PVB sheet) were as follows:

| Epoxy In Sheet | Pummel Adhesion* |
|---|---|
| None (control) | 5.4 |
| E1 | 5.0 |
| E2 | 5.4 |
| E3 | 4.8 |
| E4 | 6.0 |
| E5 | 4.8 |

*Average value obtained from five samples

The above illustrates that sheet with the noted epoxies compares favorably with the control. This shows these epoxies to be substantially inert to the level of adhesion to glass of sheet containing such epoxies as regulated by the noted glass adhesion control agent.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. A laminated glazing panel sequentially comprising:
   (A) a glass sheet;
   (B) a heat-wave-reflective or electrically conductive multi-layer coating which includes a photoreactive layer; and
   (C) a sheet of plasticized polyvinyl butyral in interfacial contact with the photoreactive layer containing epoxy resin in amount effective to counteract reduction of adhesion between the sheet and the photoreactive layer after prolonged exposure of the glazing panel to light.

2. The panel of claim 1 wherein the epoxy resin is selected from the group consisting of (a) epoxy resins comprised of the monomeric diglycidyl ether of bisphenol-A; (b) epoxy resins comprised of the monomeric diglycidyl ether of bisphenol-F; (c) epoxy resins comprised of the hydrogenated diglycidyl ether of bisphenol-A; (d) polyepoxidized phenol novolacs; (e) diepoxides of polyglycols; and (f) a mixture of any of the foregoing epoxy resins of (a) through (e).

3. The panel of claim 2 wherein the epoxy resin is a diepoxide of poly(oxypropylene) glycol.

4. The panel of claim 3 wherein the amount of epoxy resin is about 3 to about 10 parts per 100 parts of polyvinyl butyral.

5. The panel of claim 4 wherein the photoreactive layer is a dielectric material.

6. The panel of claim 5 wherein the dielectric material is ZnO, In$_2$O$_3$ or TiO$_2$.

7. The panel of any of claims 1, 2, 3, 4, 5, or 6 wherein the sheet of plasticized polyvinyl butyral further contains one or more glass adhesion-control agents and including another glass sheet bonded to the sheet of plasticized polyvinyl butyral.

8. The panel of claim 7 wherein the epoxy resin is substantially inert to the level of adhesion of the plasticized polyvinyl butyral sheet to the glass sheet as regulated by the one or more glass adhesion-control agents in the polyvinyl butyral sheet.

9. A laminated glazing panel sequentially comprising:
   (A) a glass sheet;
   (B) a heat-wave-reflective or electrically conductive multi-layer coating which includes a dielectric top layer;
   (C) a sheet of plasticized polyvinyl butyral in interfacial contact with the dielectric layer containing one or more glass adhesion-reducing agents and about 3 to about 10 parts per 100 parts of polyvinyl butyral of one or more epoxy resins capable of counteracting the reduction of adhesion of the sheet to the dielectric layer after prolonged exposure to light, said one or more epoxy resin being substantially inert to the level of adhesion of the polyvinyl butyral sheet to glass sheet (D); and
   (D) a glass sheet.

10. The panel of claim 9 wherein the dielectric layer is a metal oxide.

11. The panel of claim 9 wherein the metal oxide is ZnO, In$_2$O$_3$ or TiO$_2$.

12. The panel of any of claims 9, 10, 11 wherein the epoxy resin is selected from the group consisting of (a) epoxy resins comprised of the monomeric diglycidyl ether of bisphenol-A; (b) epoxy resins comprised of the monomeric diglycidyl ether of bisphenol-F; (c) epoxy resins comprised of the hydrogenated diglycidyl ether of bisphenol-A; (d) polyepoxidized phenol novolacs; (e) diepoxides of polyglycols; and (f) a mixture of any of the foregoing epoxy resins of (a) through (e).

* * * * *